(12) United States Patent
Andre et al.

(10) Patent No.: US 8,232,671 B2
(45) Date of Patent: Jul. 31, 2012

(54) SYSTEM FOR SPORADIC SUPPLY AND TAPPING OF ELECTRICAL ENERGY ESPECIALLY FOR AN URBAN VEHICLE USED FOR PUBLIC TRANSPORT

(75) Inventors: Jean-Luc Andre, Molsheim (FR); Laurent Verdier, Strasbourg (FR)

(73) Assignee: Lohr Industrie, Hangenbieten (FR)

(*) Notice: Subject to any disclaimer, the term of this patent is extended or adjusted under 35 U.S.C. 154(b) by 452 days.

(21) Appl. No.: 12/520,257

(22) PCT Filed: Dec. 12, 2007

(86) PCT No.: PCT/FR2007/002048
§ 371 (c)(1),
(2), (4) Date: Jul. 30, 2009

(87) PCT Pub. No.: WO2008/087287
PCT Pub. Date: Jul. 24, 2008

(65) Prior Publication Data
US 2010/0052427 A1    Mar. 4, 2010

(30) Foreign Application Priority Data
Dec. 20, 2006   (FR) ...................................... 06 11111

(51) Int. Cl.
*B60L 1/00* (2006.01)
(52) U.S. Cl. ............... 307/9.1; 191/2; 320/109; 180/2.1
(58) Field of Classification Search .................. 191/2, 6, 191/10; 320/109; 307/9.1, 10.1, 104; 180/2.1
See application file for complete search history.

(56) References Cited

U.S. PATENT DOCUMENTS

RE29,994 E  *  5/1979  Bossi ................................. 191/2
5,669,470 A  *  9/1997  Ross ................................. 191/10

FOREIGN PATENT DOCUMENTS

| DE | 103 13 698 A1 | 5/2005 |
| FR | 1 310 672 | 10/1962 |
| FR | 2 863 216 A1 | 6/2005 |
| JP | 2004 136860 A | 5/2004 |
| WO | 01/72547 A1 | 10/2001 |

* cited by examiner

*Primary Examiner* — Daniel Cavallari
(74) *Attorney, Agent, or Firm* — Davis & Bujold, P.L.L.C.

(57) ABSTRACT

A system of localized tapping sections (1, 2 or 3) is provided with air or ground units for the distribution of electrical energy and an assembly on the vehicle (4) for tapping the energy. The electrical energy distribution units are supported by distributing poles (5), only accommodate electrical voltage when the vehicle approaches the related section, and being disconnected when the vehicle (4) leaves the tapping section. The tapping sections are located in vehicle stopping zones, for example, stations (1), acceleration zones, and uphill gradients (2), in order to recharge and/or supply drive energy to the vehicle (4). The system is beneficial to autonomous urban public transportation which accumulates drive energy.

18 Claims, 3 Drawing Sheets

SYSTEM FOR SPORADIC SUPPLY AND TAPPING OF ELECTRICAL ENERGY ESPECIALLY FOR AN URBAN VEHICLE USED FOR PUBLIC TRANSPORT

This application is a National Stage completion of PCT/FR2007/002048 filed Dec. 12, 2007, which claims priority from French patent application serial no. 06-11111 filed Dec. 20, 2006.

FIELD OF THE INVENTION

The present invention relates to a system for sporadic collecting of electrical energy for an urban public transport vehicle.

BACKGROUND OF THE INVENTION

For ecological reasons, electric traction is a must for public transport in urban districts.

Overhead electricity supply lines entail putting up supporting structures and having costly and unsightly cable connections.

Besides their not very aesthetic appearance and their size, which clutter up the field of view and spoil the beauty of urban areas and monuments, catenaries present a risk of electrocution and form a height obstacle.

On the other hand public transport vehicles are being developed, which are energy-autonomous over more or less long distances. These are vehicles whose traction or propulsion is powered by electricity from electrochemical elements (batteries, supercondensers) but also by stored energy, for example in the form of kinetic energy supplied by a flywheel rotating at high speed, and other means.

Although such systems provide an interesting solution from an ecological standpoint and the present various nuisances, such as spoiling the urban landscape, their main drawback concerns their low energy storage capacity and their very moderate overall energy efficiency.

Besides, the cost of the equipment is augmented by the cost of energy accumulation means.

There are already autonomous systems which are recharged with energy at stop stations along their route and at terminal stations. These entail fairly long periods of vehicle immobility.

At these stops, energy for recharging is tapped from one or more ground rails.

For operational reasons the stop times at public transport stations cannot exceed the period of immobility that allows passengers to get off and on the vehicle.

It is desirable for that period to be as short as possible, so as not to lengthen the travel time. In addition, it is sought to reduce the period so as to improve the transit time still further.

Thus, since the recharging periods at each station are rather short, they can do little to improve autonomy.

SUMMARY OF THE INVENTION

The purpose of the present invention is to increase the duration of recharging at stations but also, and above all, to reduce the consumption of electricity from the reserves by providing supplementary or propulsive electrical energy during phases of high energy consumption such as starting off, accelerating, traveling uphill, etc.

This system of sporadic external electrical energy supply is used for recharging while at rest and to provide supplementary or simply traction energy when moving. By virtue of power system oversizing it can also participate, even when in motion, in the recharging of reserves during phases of high energy consumption.

In this way autonomy is substantially increased and the operational requirements of an urban public transport system are completely satisfied.

To that end, along the route of the urban public transport vehicle are provided track sections equipped over a sufficient length with a system for the supply and tapping of electrical energy used for the recharging of energy reserves or for supplying propulsion energy on the sections, or indeed for both of these purposes simultaneously.

Such supply and tapping sections, solely for electrical recharging, are provided in particular at stop zones of the vehicle.

Advantageously, the tapping sections are extended on either side of the stopping stations in order to increase the duration of recharging and to supply the vehicle during the phase of starting off. The energy to be transferred is reduced and the autonomy is not only preserved, but increased.

Thus, thanks to the invention autonomy is enhanced, and this by means of simple and inexpensive electrification works that use structures which are light and not very extensive, in particular in terms of length.

The localized tapping sections require little or no infrastructure and can be shared with other useful functions of the public space, such as lighting.

Urban safety and problems of visual and atmospheric pollution are greatly improved.

BRIEF DESCRIPTION OF THE DRAWINGS

Other characteristics and advantages of the invention will be made apparent on reading the detailed description presented below, with reference to the attached drawings which show.

DETAILED DESCRIPTION OF THE PREFERRED EMBODIMENTS

The description below relates to sporadic supply and tapping of electrical energy by direct or remote communication, for example by induction, for the purpose of momentary recharging of an electrical energy reserve along the route and/or in order to provide the electrical energy required for traction or propulsion during certain drive phases, by the direct or remote transfer of electrical energy.

It is of course understood, however, that this recharging or motor supply does not relate solely to a reserve consisting of batteries, but also to any possibility and any means for accumulating energy on board a vehicle from electricity coming from the outside and accumulated otherwise, in particular by supercondensers, a flywheel, and suchlike.

According to the invention, the urban route of a public transport vehicle comprises, at various locations, stretches or sections within which electrical energy is supplied and tapped. These are specific sections at stopping stations 1 or sections along the way at particular locations along which the demand for energy is greater. Among the latter can be mentioned supply and tapping stretches or sections when moving uphill 2, or when accelerating after periods of deceleration or slow movement, or starting-off sections that follow forced traffic hold-ups, for example after a traffic-light.

Figure 1:
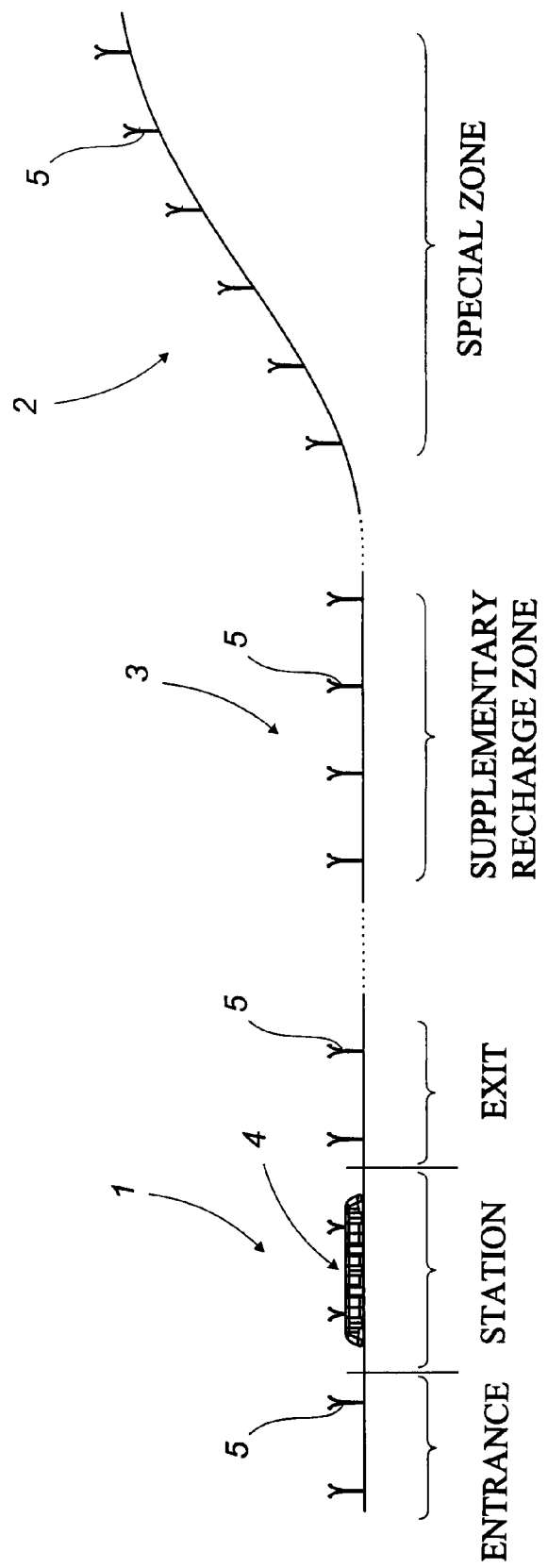
FIG. 1: Diagram of typical portions of a route, with various specific energy tapping sections.

FIG. 1 shows the implantation of the electricity supply at a stopping station 1 with an entry zone and an exit zone. It also shows an uphill section 2 defined as a special zone, and a supplementary recharging zone 3.

As shown, when the distance between stations 1 is large, supplementary recharging zones 3 can also be provided at appropriate locations through which a vehicle 4, for example an urban public transport vehicle, travels while moving. In these supplementary zones 3, the vehicle 4 can recharge its batteries, but it can also benefit from a gain in energy by momentary acceleration within the operational limits imposed by its defined exploitation conditions.

A preferred embodiment of the invention, which pertains to the overhead electrical supply of an urban public transport vehicle, will be described below. It is of course understood that the transfer of energy can take place without contact, both from overhead and at ground level, for example by induction.

Clearly, the embodiment in which tapping takes place at ground level is covered by the same inventive concept, since those skilled in the art will be able to imagine a variant of that type without difficulty.

Figure 2:
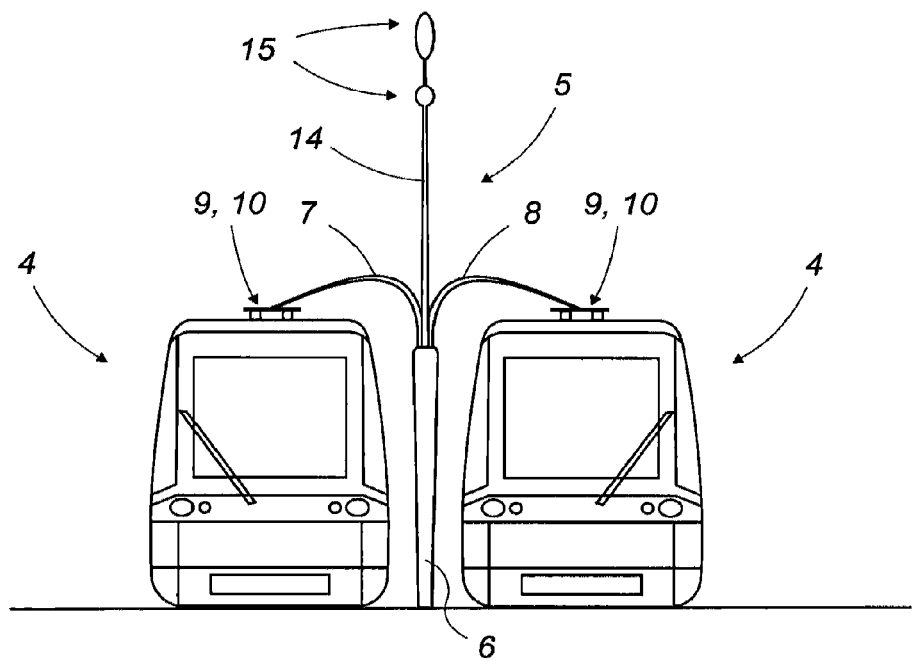
FIG. 2: Front view of two transport vehicles in position for supplying with electricity from one and the same distributing post.

Each tapping stretch or section is equipped with a plurality of individual means for supplying electrical energy, for example distributing posts such as that indexed 5, with one or with two arms, the latter when there are two parallel running tracks, for example of the type represented in FIG. 2, comprising one main stem 6 and one or two flexible arms 7 or 8.

At its end, each arm 7 or 8 has an electrical energy distribution element 9, for example in the form of a contact bar 10 in the manner of a pantograph.

The distributing posts constitute as many individual electrical energy supply sources.

They are preferably spaced at regular intervals.

The bar 10 of each distribution post comes into mobile, electrical-energy-transferring contact with at least one track of an upper electrical-energy-tapping device carried by each vehicle at the top, at the level of its roof, or at the bottom, at the level of its chassis.

Figure 4:
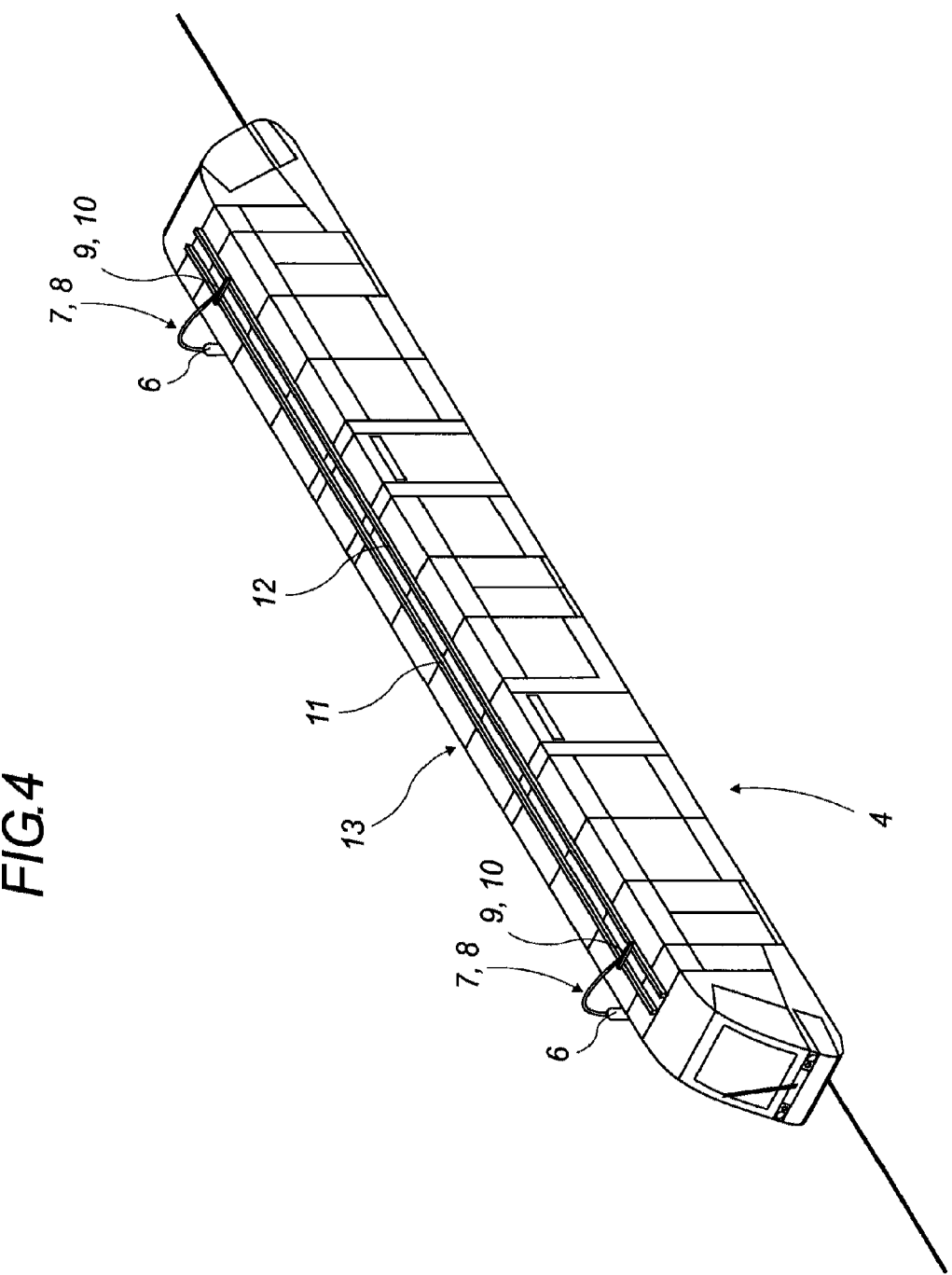
FIG. 4: Diagrammatic, perspective view showing a vehicle and its roof-mounted receiving structure, with which the electric contact elements are in contact.

As indicated diagrammatically in FIG. 4, this can consist of one or two electrically conducting tapping rails 11 or 12 that form one or two parallel tapping track(s) carried by an electrically insulating support, which is mounted via a suspension system on the roof structure 13 of the vehicle 4.

The spacing of the distributing posts 5 is preferably shorter than the length of the tapping conductor rail(s) provided on the roof of the vehicle.

The arms 7 or 8 of the distributing posts 5 are preferably relatively flexible, in order to ensure contact between the contact bar 10 and the upper tapping device of the vehicle.

Contact can also be ensured by means of an elastic force directed toward the tapping rail(s) 11 or 12, this force being produced by virtue of the elasticity of the corresponding arm 7 or 8, or by an external force acting on the arm.

With regard to the distributing posts 5, these may be multifunctional and thus perform for example the function of public lighting by terminating one or more arms 14 with one or more light source(s) 15.

Of course, to ensure uninterrupted function, in the electrical energy supply sections, the distance between distributing posts 5 must be shorter than the linear tapping length on the roof structure 13 of the receiving vehicle 4.

This type of electrical energy supply makes it possible to do without continuous overhead lines, while ensuring functionality with the same reliability. In addition, it can provide a substantially greater level of safety than that of continuous overhead lines, since for safety reasons the contact elements of the distributing posts 5 are preferably only connected to the supply when, or shortly before, the vehicle 4 arrives, and are cut off from the supply when the vehicle leaves the tapping section.

These electric supply commutations are advantageously controlled automatically by the passage of the vehicle in front or through sensors or presence-detectors (not shown) located a distance from the entrance and exit of the section concerned.

Mechanical protection of the electrical contact can also be added. This protection is automatically pushed out of the way as the contact track on the roof of the vehicle passes.

In a preferred embodiment, the arms 7 or 8 of the distributing posts 5 can be made to be raised or retracted to a rest position when the vehicle 4 is not in the tapping section, and this improves safety still more and also allows the passage of special, very tall road vehicles, such as ones in exceptional convoys, or maintenance vehicles.

Figure 3:
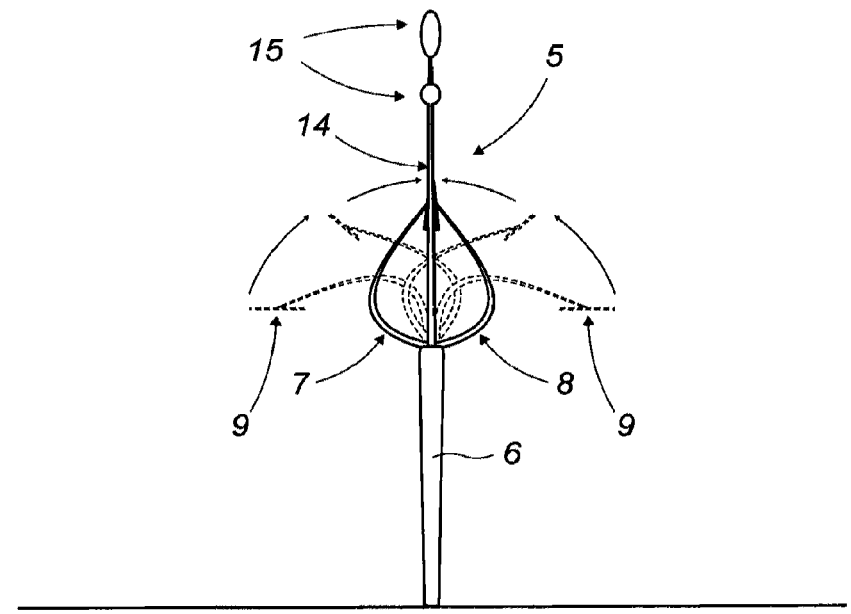
FIG. 3: Front view of a distributing post, showing the lowering of its two arms.

An example of the manner of lowering and deploying the arms is illustrated in FIG. 3.

Various supplementary variants can also be envisaged.

The invention claimed is:

1. A system for sporadic supply and tapping of electrical energy for an urban public transport vehicle (4) with an on-board reserve of propulsive electrical energy, in which localized electrical energy supply sections are provided along a route, the localized electrical energy supply sections comprising either overhead or ground-level structures for the supply of electrical energy by either contact or remotely, the electrical energy so transferred serving, during phases of momentary stopping of the vehicle, to recharge an energy reserve and, while the vehicle is moving, to provide at least one of propulsive or supplementary electrical energy, the transfer of electrical energy takes place between localized individual electrical energy supply means which constitute as many electrical energy sources recurring along the length of the section, and a tapping structure present on and extending along the vehicle, the tapping structures on the vehicle being linear, and longer than the space between two successive individual electrical energy supply means.

2. The tapping system according to claim 1, wherein the electrical energy supply sections are at least one of:
   stopping zones,
   zones at stations (1),
   zones where a slow-down is followed by acceleration,
   uphill zones (2) of the vehicle (4), and
   supplementary electrical energy supply zones (3).

3. The tapping system according to claim 1, wherein the electricity distribution system is at ground level.

4. The tapping system according to claim 3, wherein the vehicle comprises a lower tapping structure along the vehicle which co-operates with the ground-level electrical energy supply means.

5. The tapping system according to claim 1, wherein the electrical energy is supplied by overhead means.

6. The tapping system according to claim 5, wherein an upper electrical energy tapping structure, that co-operates with the overhead electrical energy supply means, is continuous over a full length of the vehicle.

7. The tapping system according to claim 1, wherein the supply of electrical energy is interrupted when the vehicle is absent.

8. The tapping system according to claim 1, wherein the supply of electrical energy is connected when the vehicle approaches an entrance of a tapping section.

9. The tapping system according to claim 1, wherein the supply of electrical energy is disconnected when the vehicle leaves a tapping section.

10. The tapping system according to claim 5, wherein the electrical energy is supplied by distributing posts (5) via at least one arm (7, 8) which has an electrical contact element at a remote end thereof.

11. The tapping system according to claim 10, wherein the electric contact element is either retractable or liftable.

12. The tapping system according to claim 10, wherein the electric contact element is an electric contact bar (10) for the supply of electrical energy.

13. The tapping system according to claim 10, wherein the electric contact element is protected when the contact element is not in an electrically supplying contact.

14. The tapping system according to claim 6, wherein the upper electrical energy tapping structure is an assembly of a plurality of electrically conducting tapping rails (11, 12) mounted on an electrically insulating support.

15. The tapping system according to claim 14, wherein a spacing of the distributing posts (5) is less than a length of the tapping rails (11, 12).

16. The tapping system according to claim 10, wherein the distributing posts (5) are spaced apart from one another at a regular intervals.

17. The tapping system according to claim 10, wherein each of the distribution post (5) has at least one light source (15) for supplementing public lighting.

18. A supply system for transmitting electrical energy to an urban public transport vehicle (4) which travels along a dedicated route and has an on-board propulsive electrical energy storage, the system comprising:

localized electrical energy supply zones which are intermittently located along the dedicated route, the energy supply zones comprising at least one of a vehicle stopping zone (1), a supplemental recharging zone (3) and a high energy consumption zone (2);

a plurality of electrical energy distribution posts (5) being arranged in each of the localized electrical energy supply zones along the dedicated route, each post (5) having a main stem (6) which supports at least one flexible arm (7, 8), a remote end of the at least one flexible arm (7, 8) has an electrical energy transmitting contact bar (10);

at least one electrical energy tapping rail (11, 12) spans linearly along a length of the transport vehicle (4) and is supported on a roof structure (13) of the transport vehicle (4) by an electrically insulated support, a length of the at least one electrical energy tapping rail (11, 12) is longer than a distance between adjacent electrical energy distribution posts (5);

at least one sensor is located along the dedicated route for controlling commutation of electrical energy to the contact bars (10) of the distribution posts (5) arranged in a corresponding one of the localized electrical energy supply zones; and the at least one flexible arm (7, 8) being movable between a rest position, in which the contact bar (10) is disconnected from the at least one electrical energy tapping rail (11, 12), and a supply position, in which the contact bar (10) contacts the at least one electrical energy tapping rail (11, 12) and transmits electrical energy thereto, depending on a presence of the transport vehicle (4) within the corresponding one of the localized electrical energy supply zones.

* * * * *